Figure 1:
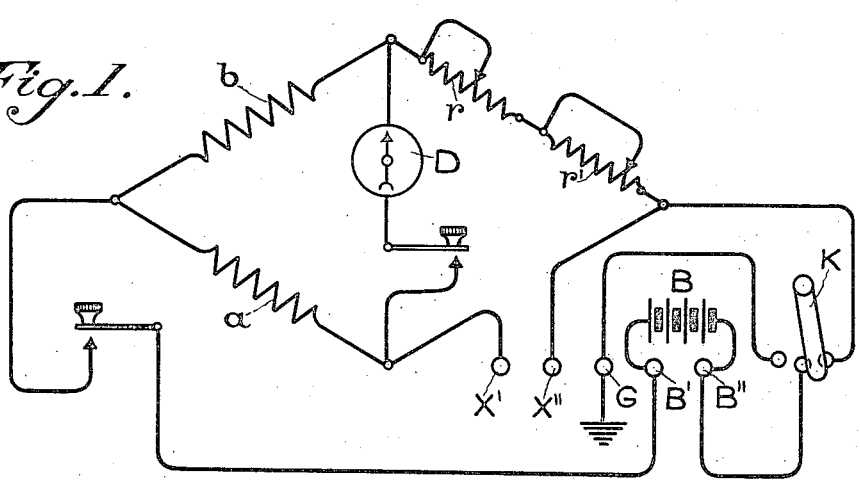

H. M. FRIENDLY.
APPARATUS FOR FAULT LOCATION ON ELECTRICAL CONDUCTORS.
APPLICATION FILED JUNE 10, 1907.

1,057,817.

Patented Apr. 1, 1913.
10 SHEETS—SHEET 1.

Witnesses:

Herbert M. Friendly,
Inventor.

by McMeen & Miller
Attorneys.

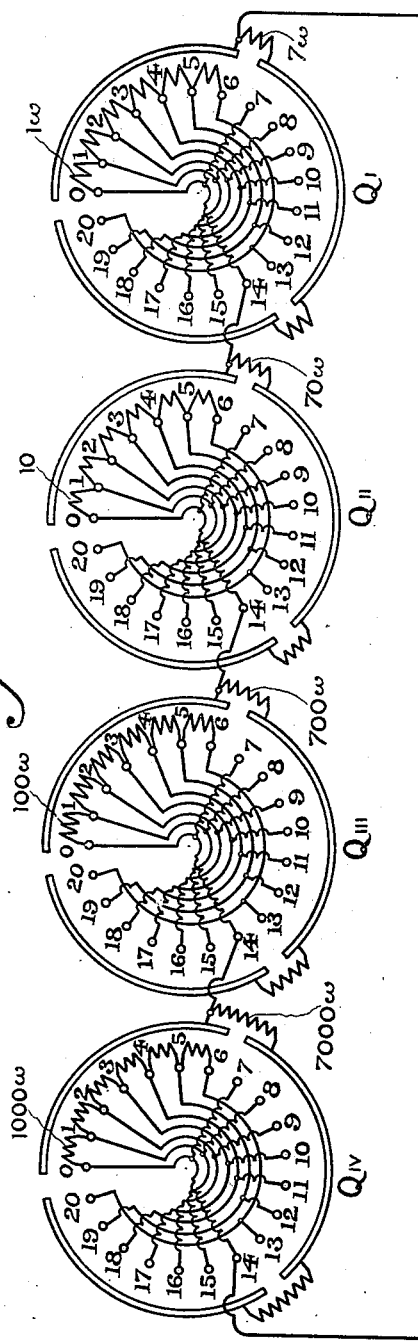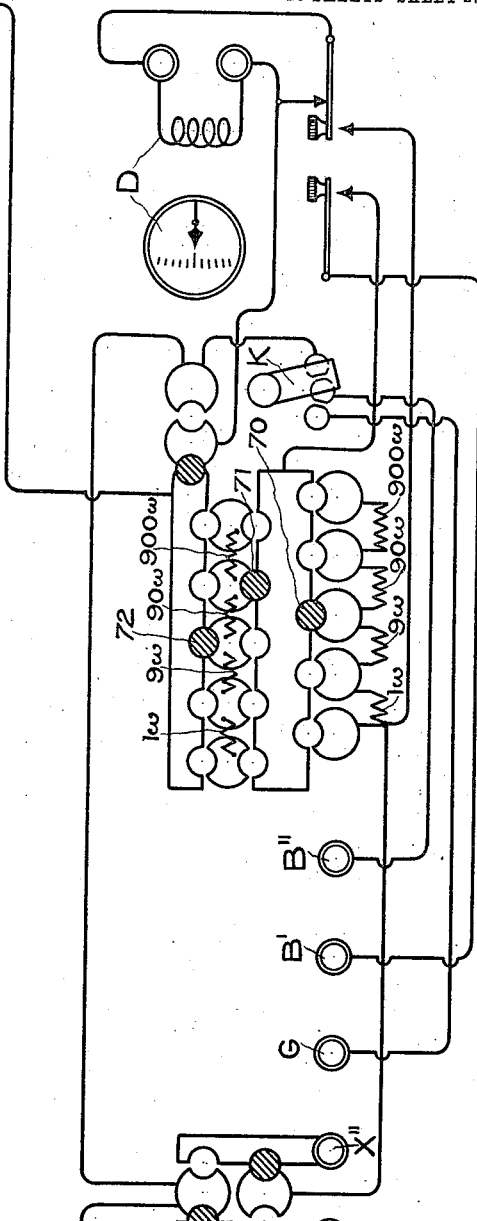

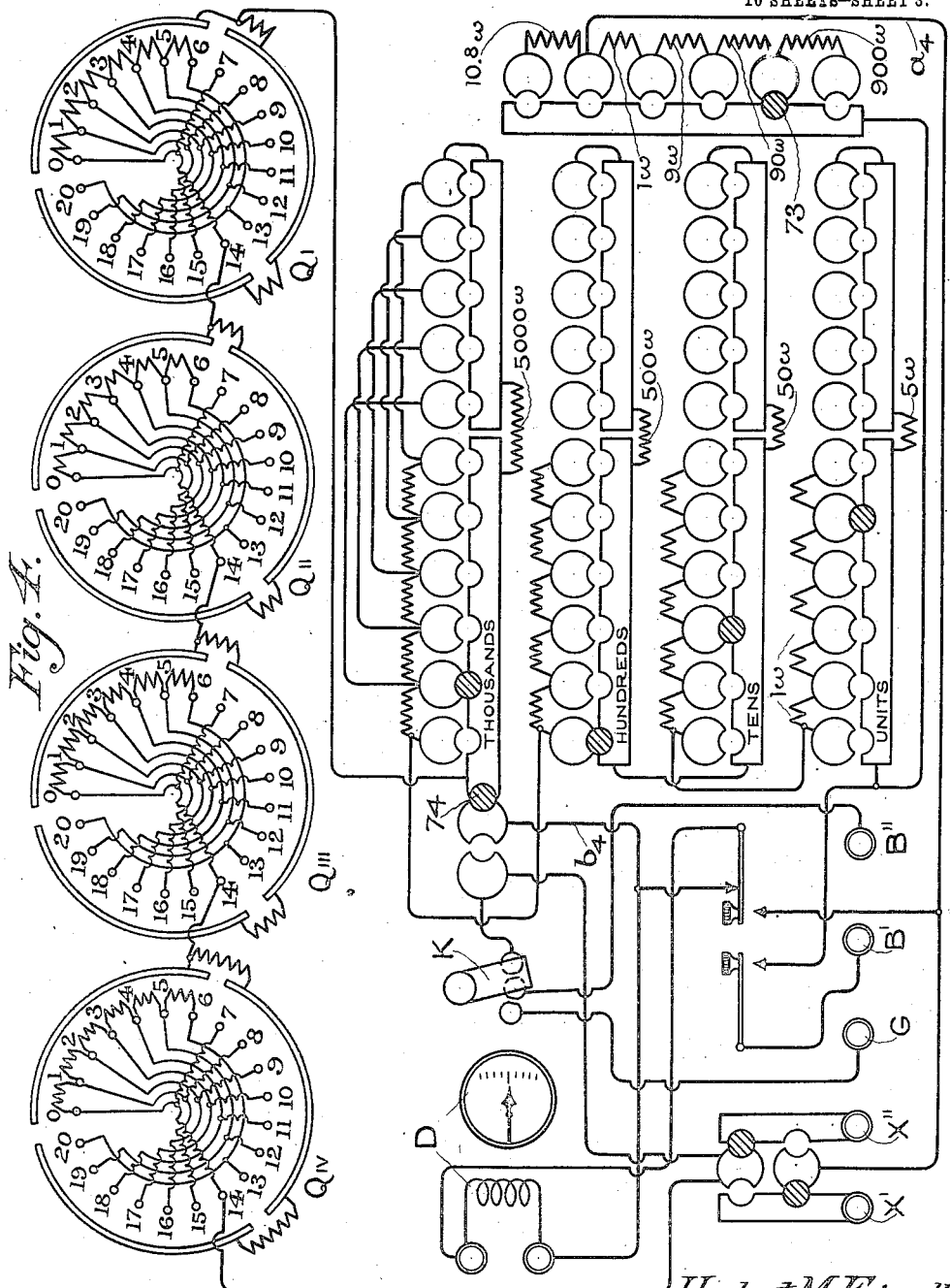

H. M. FRIENDLY.
APPARATUS FOR FAULT LOCATION ON ELECTRICAL CONDUCTORS.
APPLICATION FILED JUNE 10, 1907.
1,057,817.
Patented Apr. 1, 1913.
10 SHEETS—SHEET 4.
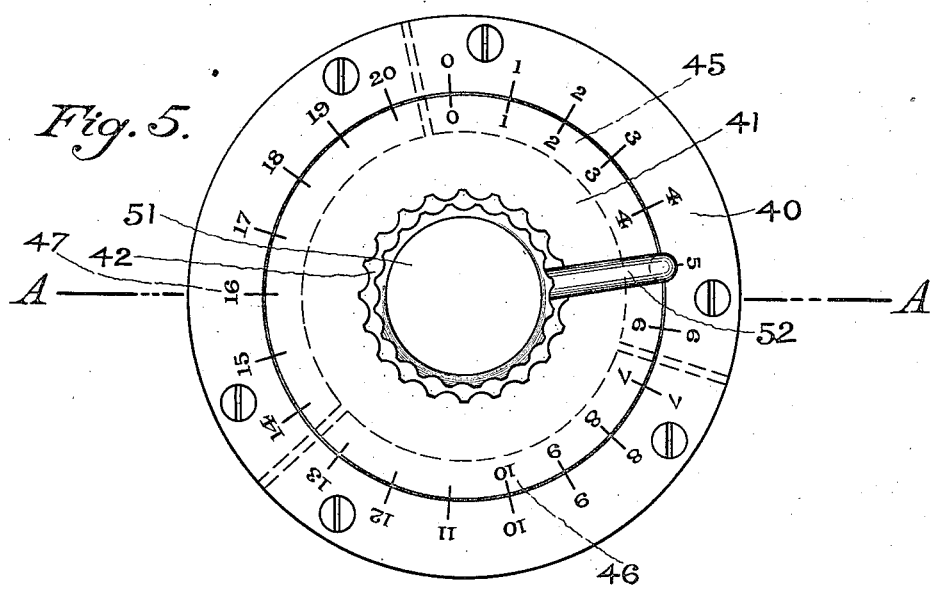
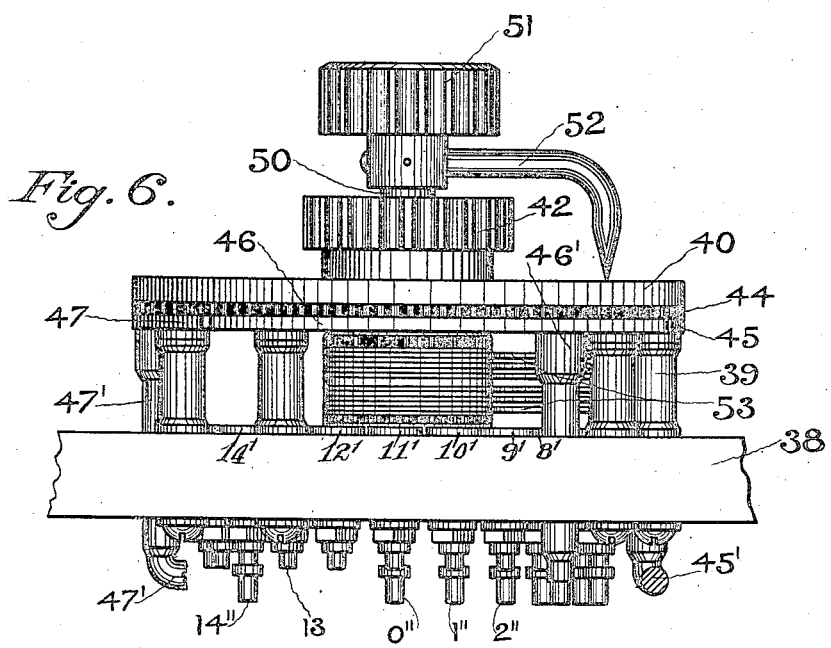
Witnesses:
Herbert M. Friendly,
Inventor.
by McMeen + Miller
Attorneys.

H. M. FRIENDLY.
APPARATUS FOR FAULT LOCATION ON ELECTRICAL CONDUCTORS.
APPLICATION FILED JUNE 10, 1907.

1,057,817.

Patented Apr. 1, 1913.
10 SHEETS—SHEET 5.

Witnesses:

Herbert M. Friendly,
Inventor.

by McMean & Mueen
Attorneys.

H. M. FRIENDLY.
APPARATUS FOR FAULT LOCATION ON ELECTRICAL CONDUCTORS.
APPLICATION FILED JUNE 10, 1907.
1,057,817.
Patented Apr. 1, 1913.
10 SHEETS—SHEET 6.
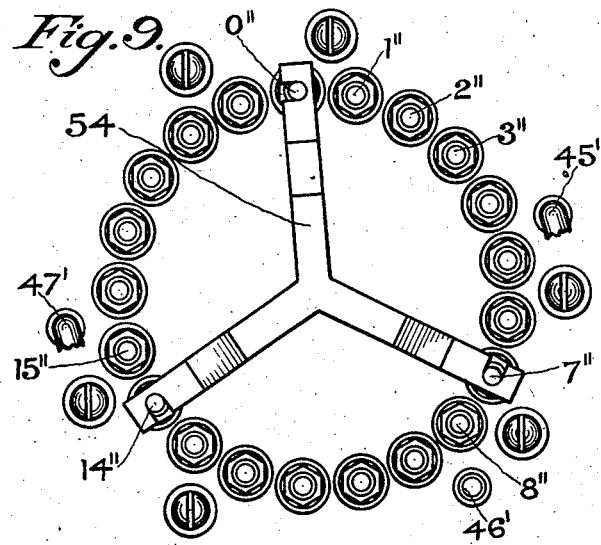
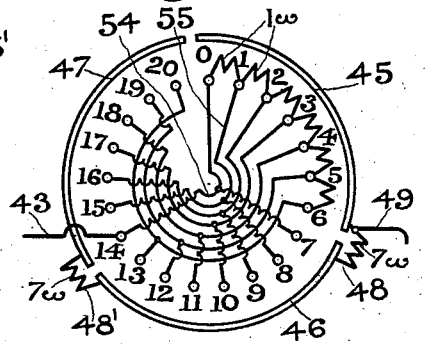
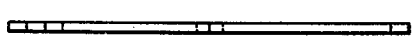
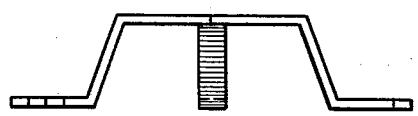
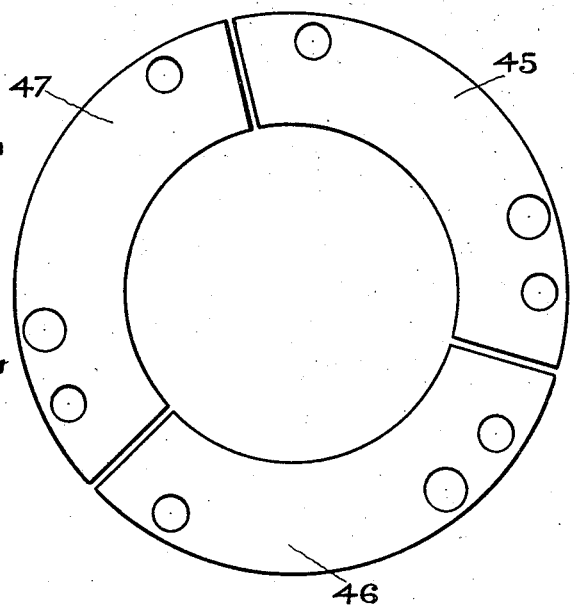
Witnesses:
Herbert M. Friendly
Inventor.
by McMeen & Miller
Attorneys H. M. FRIENDLY.
APPARATUS FOR FAULT LOCATION ON ELECTRICAL CONDUCTORS.
APPLICATION FILED JUNE 10, 1907.
1,057,817.
Patented Apr. 1, 1913.
10 SHEETS—SHEET 7.
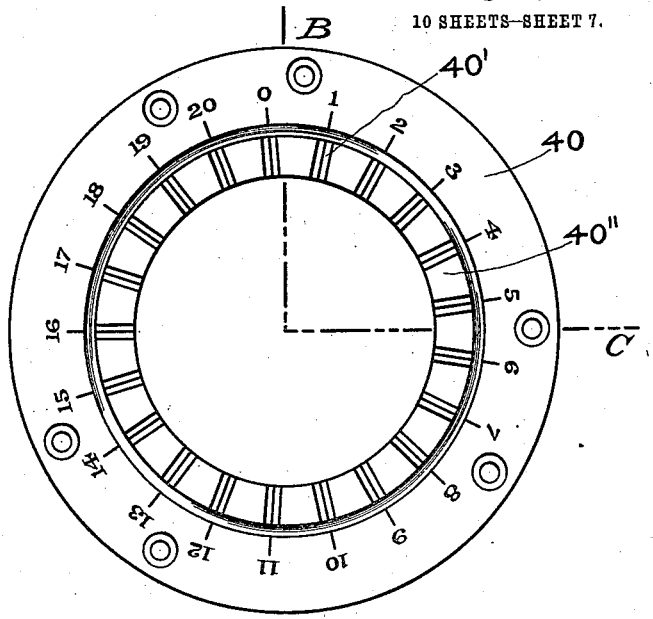
Fig. 15.
Fig. 17.
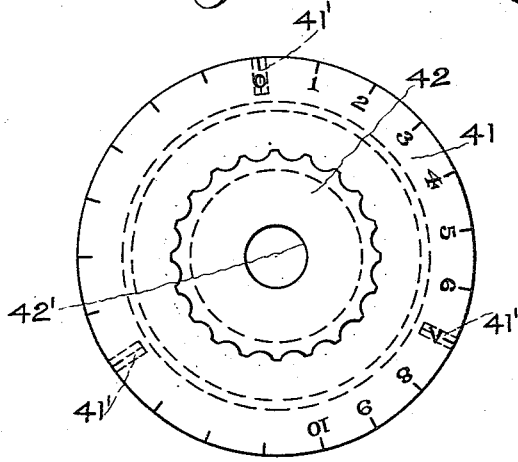
Fig. 16.
Fig. 18.
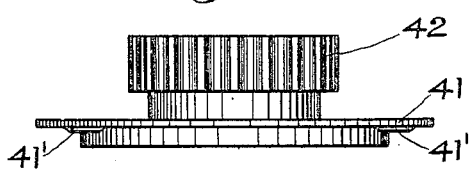
Witnesses:
Herbert M. Friendly,
Inventor.
by McMueen & Mueen
Attorneys H. M. FRIENDLY.
APPARATUS FOR FAULT LOCATION ON ELECTRICAL CONDUCTORS.
APPLICATION FILED JUNE 10, 1907.

1,057,817.

Patented Apr. 1, 1913.
10 SHEETS—SHEET 8.

Witnesses:

Herbert M. Friendly,
Inventor.

by McMeen & Miller
Attorneys.

H. M. FRIENDLY.
APPARATUS FOR FAULT LOCATION ON ELECTRICAL CONDUCTORS.
APPLICATION FILED JUNE 10, 1907.
1,057,817.
Patented Apr. 1, 1913.
10 SHEETS—SHEET 9.
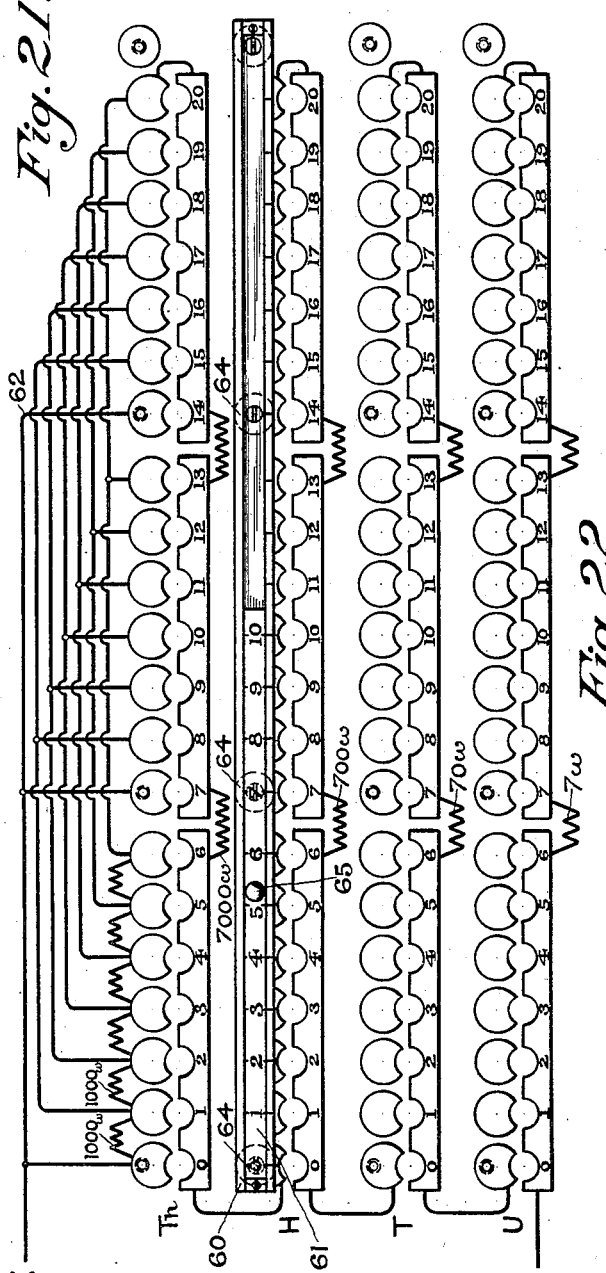
Witnesses:
Harael C. Prado
David S. Kilfish
Herbert M. Friendly,
Inventor.
by McKeen & Miller
Attorneys.

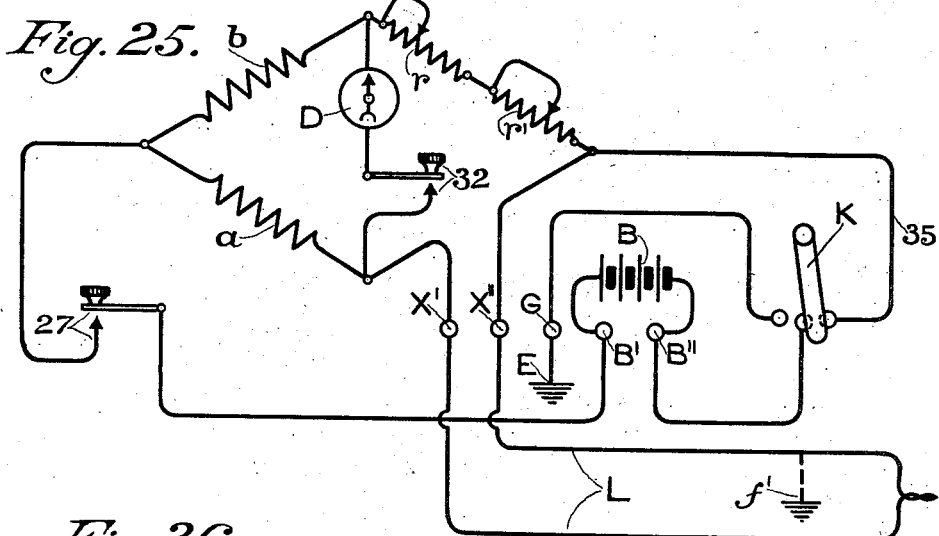
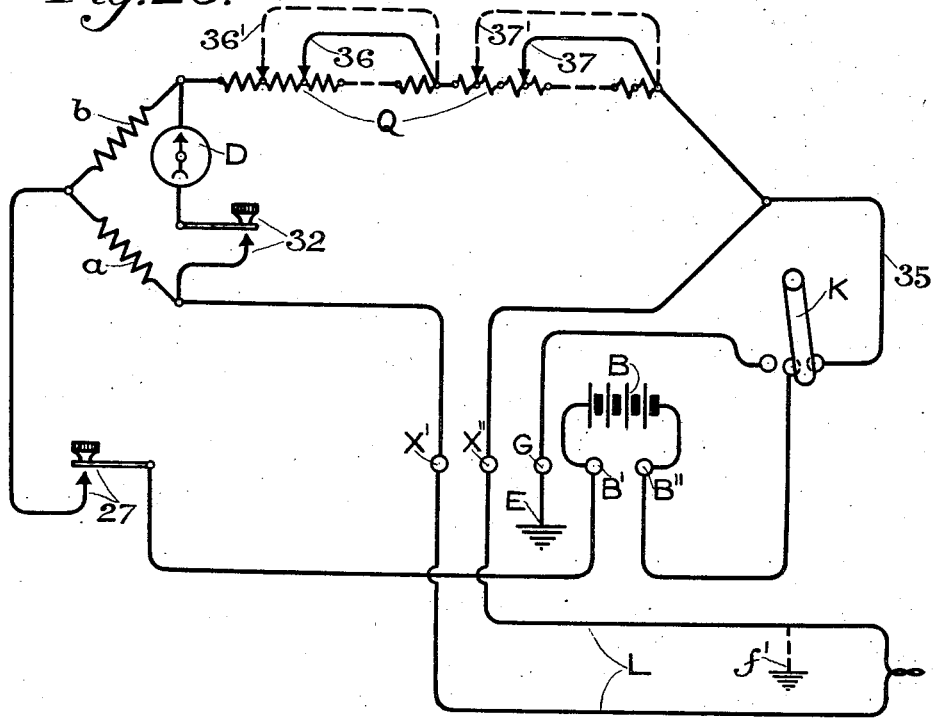

UNITED STATES PATENT OFFICE.

HERBERT M. FRIENDLY, OF PORTLAND, OREGON.

APPARATUS FOR FAULT LOCATION ON ELECTRICAL CONDUCTORS.

1,057,817.   Specification of Letters Patent.   Patented Apr. 1, 1913.

Application filed June 10, 1907. Serial No. 378,196.

*To all whom it may concern:*

Be it known that I, HERBERT M. FRIENDLY, a citizen of the United States of America, and a resident of Portland, county of Multnomah, and State of Oregon, have invented a new and useful Improvement in Apparatus for Fault Location on Electrical Conductors, of which the following is a specification.

My invention relates to that class of electrical testing devices intended for use in locating grounds or crosses on electrical conductors in cables or on insulators, and involving the use of adjustable resistances and of a galvanometer or other current-detecting device.

It is well known to utilize adjustable resistances and galvanometers or other current detectors, in connection with sources of current for locating grounds and crosses upon lines; but in all the methods which are available for use with apparatus of limited complication and reasonable scope, a certain amount of mathematical calculation is necessary after the manipulation of the instruments has been completed.

My invention enables fault locations to be made with a minimum of operations and calculations, rendering possible the formulation of specific instructions which need but to be followed by a person of usual intelligence and limited special training to enable the results to be reached in terms commonly understood and not complex.

Figure 2:
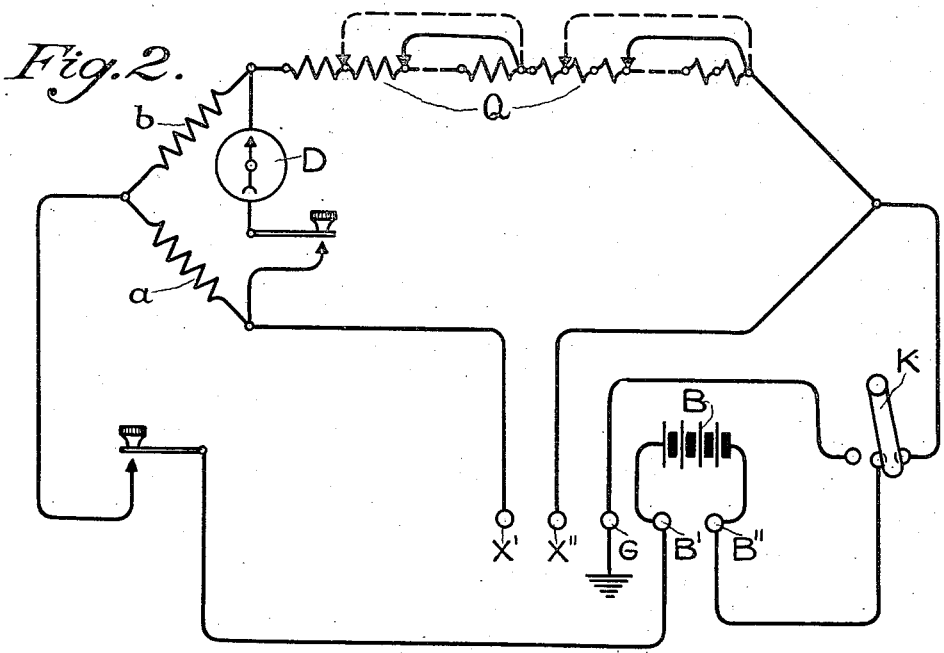
Figure 7:
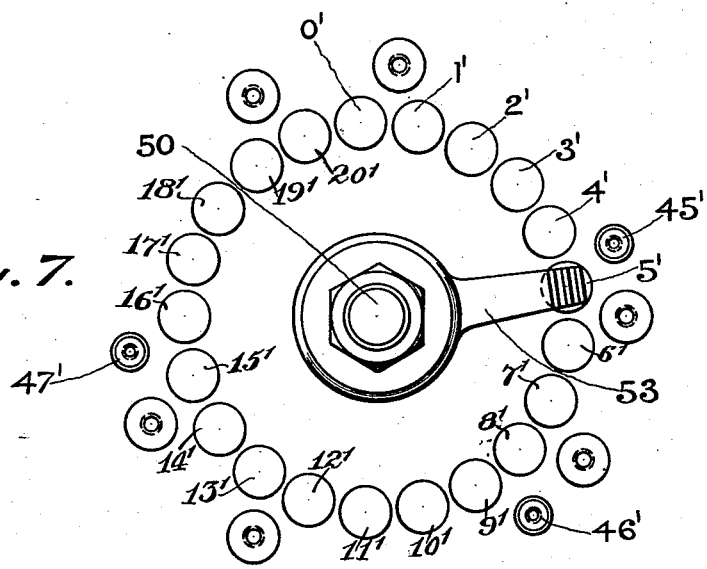
Figure 8:
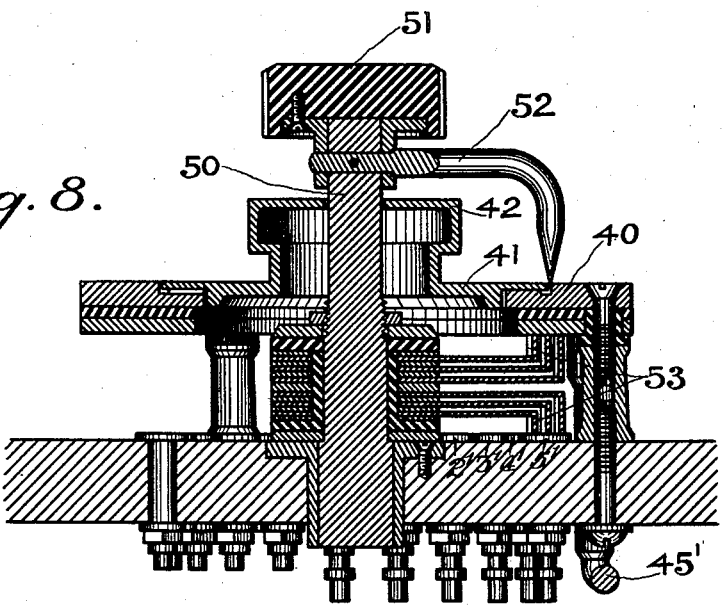
Figure 19:
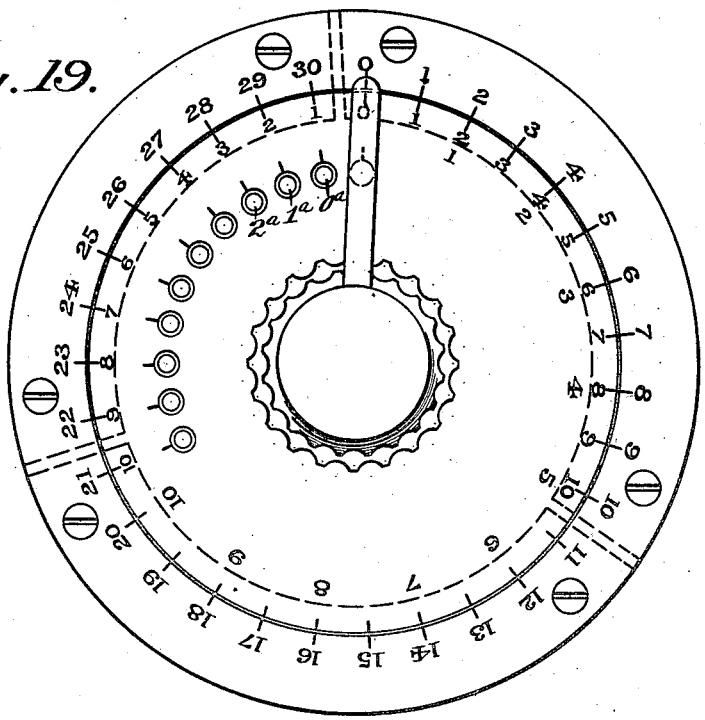
Figure 20:
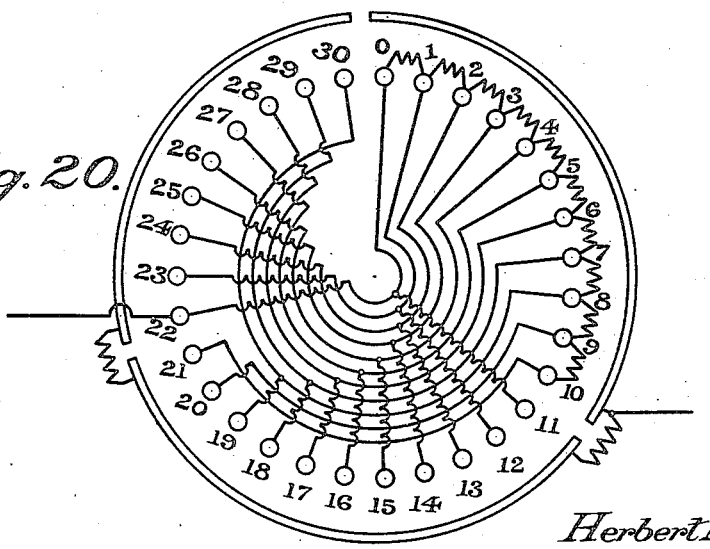

My invention is illustrated in the accompanying drawings, in which,

Figure 1 is a diagram of a circuit representing a modified Wheatstone bridge for determining the location of faults upon electrical conductors according to the process of my invention described herein, two independent adjustable resistances being included in one of the bridge arms. Fig. 2 is a diagram of a similar equipment using a single adjustable resistance divided into units and capable of a plurality of successive adjustments. Fig. 3 is an apparatus and circuit diagram in amplification of the schematic diagram of Fig. 2, many details of the application of Fig. 2 to practice being shown in Fig. 3. Fig. 4 is a modification of Fig. 3, involving a pair of adjustable bridge arms designed for universal use as compared with the highly specialized but simpler bridge arm rheostats of Fig. 3. Fig. 5 is a top plan showing knobs, pointer and dials of a rotary adjustable resistance or rheostat. Fig. 6 is an elevation of the device of Fig. 5 with resistance coils omitted. Fig. 7 is a plan view of the device of Fig. 5 with knobs, pointer and dials removed. Fig. 8 is a section of the device of Fig. 5 on the line A A. Fig. 9 is a bottom view of the device of Figs. 5 and 6, with only one three-point conducting link in place, the remaining links being omitted for simplicity. Figs. 10, 11 and 12 show elevations of three three-point conducting links. Fig. 13 is a circuit diagram of the device of Figs. 5 and 6. Fig. 14 shows the three conducting arcs forming contact members of the device of Figs. 5 and 6 for electrical connection with the upper portion of the rotary brush. Fig. 15 is a plan of the outer dial. Fig. 16 is a section of the dial of Fig. 15, broken away on the broken line B—C. Fig. 17 is plan of the inner dial. Fig. 18 is elevation of the inner dial. Fig. 19 is plan of knobs, pointer and dials on a thirty-unit rotary rheostat. Fig. 20 is a circuit diagram of the rheostat of Fig. 19. Fig. 21 is plug-block plan and circuit diagram of a rectilinear plug rheostat equipped with an adjustable auxiliary scale per my invention. Fig. 22 is plan of the adjustable auxiliary scale of Fig. 21. Fig. 23 is an elevation of the scale, and Fig. 24 is a section and view of the scale of Fig. 23 taken on the line D—D. Fig. 25 is the apparatus of Fig. 1, connected to a defective conductor and exhibits the conditions of the well-known Varley loop test. Fig. 26 is a Varley loop test using the diagram of Fig. 2.

Throughout all the figures showing mechanical details the resistance coils have been omitted. My invention is independent of specific detail of resistance beyond those fundamental principles of heat co-efficient, zero inductance, etc. desirable and usual in Wheatstone bridge devices. The resistances of course are shown in the circuit diagrams, and terminal provisions for the connection of the resistances are shown in the figures covering mechanical details.

It is assumed at the outset that the various ordinary methods of testing for the value of an unknown resistance by the Wheatstone bridge principle are well known, and that that variation of the Wheatstone bridge principle which is known as the Varley loop test is also well understood, as it is these methods which are by far the most widely used in resistance measurements, particularly upon telegraph and telephone lines.

Considering the case of a test to be made to determine the location of a ground or cross upon one of two wires, one of the wires used in the test being clear of any fault, these two wires being joined at the distant end,—it will easily be seen that the ordinary Varley loop test may be applied. In this case a calibrated resistance, such as $r$, would be inserted in the conductor leading from one terminal of the galvanometer to the wire having the fault upon it. Then with the battery grounded at E so as to supply current through the fault, this resistance may be adjusted until no deflection of the galvanometer occurs, under the general conditions shown in Fig. 25. The customary formula for the Varley loop test is:

$$R = \frac{bL - ar}{a+b}$$

R being the resistance in ohms from the point of testing to the fault $f'$, $b$ and $a$ being the respective arms of the bridge in the general relation shown in the figure, L being the total series resistance of the two wires under test, or, in other words, of the loop, and $r$ being the resistance of the rheostat as varied to produce a condition of no deflection in the galvanometer.

The three distinct steps in the ordinary Varley loop test as performed on my apparatus may be understood by referring more particularly to the exact conditions shown in Fig. 25.

Arranging the device of Fig. 1 in association with the defective conductor as indicated in Fig. 25, with the fault at $f'$ on one defective wire of the loop L, the loop L consisting of the defective wire connected at its distant end to a good return wire, with a known ratio between the bridge arms $a$ and $b$ and with the resistance $r'$ adjusted to zero, the resistance $r$ may be varied until no deflection of the galvanometer G occurs when the keys 27 and 32 are depressed. Under the conditions established, the test made will have been a simple Wheatstone bridge measurement of the resistance of the loop L, and this resistance is determined at once in standard units of resistance by multiplying adjusted calibrated resistance $r$ by the previously established ratio of $a$ to $b$. Knowing the value thus determined and changing the switch K to connect the battery B to ground instead of to conductor 35, thus applying the battery through the ground E and the fault $f'$, the resistance $r$ may be again adjusted to a balance. All quantities in the second member of the Varley loop equation are now known, and the resistance R from the testing device over the faulty wire to the point of fault may thus be determined.

The foregoing illustrates the application of the key K, which may be named the commutator of my invention to two of the principal useful forms of testing involving subsequent calculations, that is, to the measurement of resistances, as of the loop L, Fig. 25, by the simple Wheatstone bridge method, and to the ordinary application of the bridge to Varley loop methods. It is, however, to the arrangement of apparatus for a new process or method of measurement or of fault location that my invention is directed.

In the Varley loop test, as ordinarily practiced, three steps are necessary: first, the determination of the loop resistance of the two wires under test; second, the balancing of the good wire in series with the remote portion of the faulty wire against a known variable resistance in series with the near portion of the faulty wire, and third, the substitution of the loop resistance determined in the first step, and the resistance necessary to balance as determined in the second step, in the Varley loop equation already given, in order to solve for the resistance to the fault on the faulty wire.

In my improved method, made possible by my improved arrangement of apparatus, the loop resistance L is involved in the balancing of the resistance $r'$, and the resistance $r'$ then is retained as a part of the circuit of the later test. The introduction of the result of the first test into the second test thus is made automatically, the necessity of any knowledge on the part of the operator of the loop resistance or of the absolute value of the $r'$ resistance is obviated. This method may be understood from Fig. 25. With the arrangement as shown, but with the key K in its alternative position, supplying battery B through earth and the fault $f'$, and with $r$ adjusted to zero, the resistance $r'$ may be adjusted to a balance of the galvanometer. For this adjustment I prefer a ratio of $a$ to $b$ such that $a$ will be 1/9, 1/99, etc., of $b$, the sum of $a$ and $b$ being always some power of ten when referred to $a$ as base. When a balance has been reached, shift switch K to the position illustrated in Fig. 25, and, leaving $r'$ as adjusted, adjust $r$ until a balance of the galvanometer is reached. Then the resistance in ohms to the fault is the resistance of $r$ as adjusted, multiplied by the ratio of the arm $a$ to the sum of the arms $a$ and $b$. That this is so is readily proven:

With the first measurement involving the battery circuit through earth and the fault, $r$ being zero, $$\frac{a}{b} = \frac{L-R}{r'+R} \quad (1)$$

For the second adjustment, with the switch K in the position shown, leaving $r'$ as previously adjusted and arriving at a balance by the adjustment of $r$, $$\frac{a}{b} = \frac{L}{r+r'}, \text{ or } L = \frac{a(r+r')}{b}$$

Substituting this value for L in (1) and solving for R, $$R = r\frac{a}{a+b}$$

But with the values chosen the sum of $a$ and $b$ is always some power of ten when referred to $a$ as a base; therefore, $$\frac{a}{a+b} = \frac{1}{10^x},$$

and the value of R therefore becomes $$R = \frac{r}{10^x}$$

and the calculation is simply to divide the value of $r$ by the particular power of 10, or in other words to point off from the right of the adjusted value of $r$ as many places as there are ciphers in the power, or units in the index of the power.

It will be seen that the operations here are exceedingly simple, and with the prerequisite bridge arm relations established, no real calculations whatever are necessary.

It will be noticed that in the first adjustment to galvanometer zero by the use of resistance $r'$, something of the usual process of determining the value of the resistance $r'$ was accomplished, but in contradistinction from methods requiring an exact determination of the numerical value of the resistance $r'$, my method takes no account of the nominal numerical value of $r'$ but only utilizes it in a way such that it finally disappears from the equation without its value having been definitely determined, leaving that determination in the circuits as a means to a final end, and not as an element of calculation. An alternative device, utilizing fundamentally the same principle of measurement, is shown diagrammatically in Fig. 26, the bridge arrangement of Fig. 2 being adapted to the testing circuit in this instance. The arrangement is identical with that of Fig. 25, except that the adjustable resistance is of one integral rheostat instead of being in two separate adjustable resistances as in Fig. 25. The rheostat of Fig. 26, which may be designated as a whole as Q, is shown as two sets of resistances as typical of such devices wherein a succession of 10-ohm resistances is connected in series with a succession of 1-ohm resistances and a movable terminal for each set of resistances being applied between any two resistance elements to include any desired amount of resistance in the circuit in which the device may be connected.

In using the circuit and apparatus of Fig. 26, the first step is to adjust to a balance of the galvanometer with the key K connecting battery B through earth and the fault $f'$. To obtain this adjustment it is assumed that both tens and units of the rheostat Q will be employed. Let the dotted terminals 36' 37' represent the position of the flexible terminals of the rheostat with this adjustment, which corresponds to the adjustment of $r'$ in Fig. 25, and let the numerical value of this adjustment be indicated by the symbol $q'$. The second step is made by changing the switch K to the position illustrated and again adjusting the rheostat Q to a balance of the galvanometer. Necessarily the indication of the rheostat Q will be larger upon this second adjustment than upon the first adjustment. Let the solid terminals 36—37 represent the positions of the flexible terminals of the rheostat Q at this second adjustment, which represents a resistance in the bridge arm equivalent to the combined resistances of $r$ and $r'$ of Fig. 25; and let the numerical value of the total resistance as thus adjusted by the second step be represented by the symbol $q'+q$. It is evident therefore that $q$ in the method of Fig. 26 is the exact equivalent of $r$ in the method of Fig. 25, and that the result in ohms to the fault may be determined by the same simple operation, viz., that of pointing off from the right of the determined value of $q$ as many places as there are ciphers in the power, or units in the index of the power, of ten in the ratio of $a$ to $a+b$.

The process of Fig. 26 involves the subtraction of the resistance as first adjusted from the resistance as later adjusted in the rheostat Q. I shall describe next, rheostat devices with adjustable scales whereby this subtraction may be made mechanically and without the necessity of determining the value of $q'$, the value of $q$ being read directly from the rheostat scale after the termination of the two required adjustments.

Figs. 5 to 18 inclusive show details and assembly of a rheostat having twenty-one positions of adjustment and having a resistance between its terminals varying by uniform steps from zero resistance to twenty times the resistance determined by one step. The rheostat construction is independent of the size of the resistance unit and may vary by ohms from zero to twenty, by tens of ohms from zero to two hundred and by hundreds of ohms from zero to two thousand, etc. In further description of the device, a one-ohm step will be assumed for convenience in reference.

Upon a base-block 38 is mounted by pillars 39 a disk dial hereinafter called the fixed or outer dial. This fixed dial is numbered from zero to twenty inclusive in its twenty-one steps and may be of any desired material, as it is not necessarily either conductor or insulator. It is shown in detail in Figs. 15 and 16, Fig. 15 showing plan and Fig. 16 section and partial elevation. It will be noted that a groove, as at 40', is cut radially for each of the twenty-one indication positions of the dial 40, this groove being on a shelf 40'' lying within and below the surface bearing the indicating figures. Within the fixed or outer dial 40 is a movable auxiliary inner dial 41 numbered 0 to 10, the numbers corresponding angularly with the numbers of the outer dial. Detail of this dial is shown in plan in Fig. 17 and in elevation in Fig. 18. The dial presents a thin edge which rests upon the shelf 40'' of the outer dial 40, and angular registration of the dials is maintained by the radial ribs 41' which engage the radial slots 40' in any position of the inner dial wherein its scale units register angularly with scale units of the outer dial. The inner dial rests loosely within the outer dial and may be turned by the knob 42 forming an integral part of the inner dial. The opening 42' in the knob 42 affords clearance between the inner dial and a central shaft.

The electrical details of the rheostat are as follows: Upon the base block 38, Fig. 6, are mounted a circle of conducting studs or buttons numbered 0' 1' 2' 3' 4', etc., in Fig. 7, which shows a view of the base block and studs or buttons with the dials removed. These contact buttons are the upper ends of studs which pass through the base block and appear below it as soldered terminals 0'' 1'' 2'', etc., being long from 0'' to 6'' inclusive and short from 7'' to 20'' inclusive, except that No. 14'' terminal is long for the attachment of an additional wire. By reference to the circuit diagram of Fig. 13 it will be seen that resistance coils of one-ohm each are connected between the terminals at position 0 and position 1, etc., to and including position 6, the terminals 0'' to 6'' being long for this purpose, after which resistance coils are not connected directly and the terminals are short except at terminal 14'' where the leading in wire 43 is provided for by the long terminal at 14''. The resistance coils are not shown in detail. Upon the under surface of the fixed scale 40, and insulated from it by the insulating septum 44 are three conducting arcs, 45—46—47. These arcs respectively lie above contact buttons 0' to 6', 7' to 13', and 14' to 20'; they are connected by conducting studs 45'—46'—47' to terminals below the base block connected for the adjustment of the 7-ohm resistances 48 and 48' and of the leading in wire 49. Concentric with the dials there is mounted in the base block the revolving shaft 50 carrying knob 51, pointer 52 and double brush 53. The brush 53 has upper and lower contact fingers which make contact simultaneously with the surface of the conducting buttons 0' 1' 2', etc. to 20', and with the conducting arcs 45—46—47, thus in each of the proper dial positions of adjustment connecting one of the conducting buttons to one of the conducting arcs and thus (by reference to Fig. 13) connecting together the leading in wires 43—49 through one or more of the resistance elements. The electrical circuits are completed by a set of three-point conducting links, one of which is shown in plan at 54 in Fig. 9, connecting terminals 0'' 7'' 14'' and three of which are shown in elevation in Figs. 10—11 and 12. Seven such links are required, the first a flat one per Fig. 10 connecting say terminals 1'' 8'' 15''; the second one per Fig. 11 connecting another set of three terminals, but by reason of its raised center maintaining an insulating distance from the flat link first installed. Successive links are higher, each to clear all of the links formerly installed, the shape of one of the later links being shown in elevation in Fig. 12. These links appear in Fig. 13 as radial conducting lines connected by circular conducting lines, the radial lines passing to the respective conducting buttons at positions 0, 7, 14; 1, 8, 15; 2, 9, 16; etc.

The brush 53 is controlled by a knob 51 acting through the shaft 50, and the position of the brush is indicated by the position of the pointer 52, the pointer 52 indicating upon the scale 40 the amount of resistance which in that position of adjustment the brush 53 permits to be included between the leading in wires 43 and 49.

The inclusion of a resistance varying from zero to 20 ohms could be effected by the use of twenty resistance coils of 1-ohm each connected all around from 0 to 20, the arcs 45—46—47 then being a continuous conductor connected to leading in wire 49. I produce a cheaper method of manufacture by using only eight resistance coils, six of which are 1-ohm each and two of which are 7-ohms each. The circuit through Fig. 13 may be traced as follows:—With brush 53 in zero position, from wire 43 through terminal at 14, link 54, terminal at 0, brush 53, arc 45 to wire 49. With brush 53 in position 1, from wire 43 through terminal at 14, link 54, terminal at 0, first resistance of 1-ohm, terminal at 1, brush 53, arc 45 to wire 49. With brush 53 in position 7, from wire 43, through terminal at 14, link 54, terminal at 7, brush 53, arc 46, 7-ohm resistance coil 48 to wire 49. With brush 53 in position 8, from wire 43, through terminal at 14, link 54, terminal at 0, first 1-ohm resistance coil, terminal at 1, link 55, terminal at 8, brush 53, arc 46, 7-ohm resistance coil 48 to wire 49, including 8 ohms in the circuit. With brush 53 in position 15, from wire 43 through terminal at 14, link 54, terminal at 0, first 1-ohm resistance coil, terminal at 1, link 55, terminal at 15, brush 53, arc 47, 7-ohm resistance coil 48', arc 46, 7-ohm resistance coil 48 to wire 49, including 15 ohms in the circuit.

It will be understood thus that by division of the total steps into any number of parts, and by proper multiple-point link connectors with a limited number of unit resistances and a proper number of auxiliary resistances of required size, the system herein set forth is capable of diversified application, of which the device chosen for illustration in Figs. 5 to 18 inclusive is a specific instance. The same fundamental principle of resistance manipulation is exhibited in another specific instance in the circuit diagram of Fig. 20, and in a different mechanical type of rheostat in Fig. 21.

In use a plurality of rheostat units are connected in series with decimal relation between the resistances of each rheostat and its adjacent rheostat or rheostats, as indicated in Fig. 3.

Each dial has an adjustment of one unit to 20 units. The first adjustment would be made by revolving the contact arms by means of the top handles until a state of balance is reached. To this point the operation is the same as in any Wheatstone bridge and the same equations hold good. The movable dial in each decade is then turned until its zero is opposite the indicating pointer for the contact arm. The movable dials are left as now adjusted and the resistance is readjusted, starting with the decade on the left and not returning the pointers to their original 0's. This establishes a new zero, as it were, the value as read from the movable dials after taking the second balance is the difference between the value of the first reading and the actual value of the second reading. Before taking the second reading the battery switch is turned to change the grounded pole of the battery from ground to the instrument terminal of the faulty wire, as in an ordinary loop or resistance reading, or as in taking the second reading as described with reference to Fig. 25. It will be observed that the value as read from the movable dial will be numerically the same as the value found for $r$ in the second reading, per. Fig. 25, and the decimal point is placed in the same manner as in the case of Fig. 25.

It is a fact that in the first balance (with battery grounded), the resistance inserted is less than when the second balance is completed. This value might under certain conditions (if the fault is at the terminal of the instrument, and a reverse test were being made), be equal, but not greater. This would mean that the arms would always be turned ahead, if at all, thus always giving positive values.

It is stated above that the arms are started from their positions as at first adjusted when taking the second reading, and are not turned back; that is, the contact arm is not changed, to the actual zero. The reason for this is that if any of the figures in the value of the second reading would be less than the first, a negative reading would result in the particular decade, which would complicate the result. As an example,—say the first reading was actually 6856, the second actually 8957. In the latter case, the values in all decades are as large or larger than in the former, which would show 2101 on the movable dial, being the difference between the first and second readings. Had the second reading been 8934, the tens and units dials would have negative values, though the latter as a whole number is greater. It is this condition which makes it necessary to have at least 19 units in each decade (excepting possibly the first, or left).

In making an ordinary arithmetical subtraction, when a certain decade in the number to be subtracted is greater than the number from which it is to be subtracted, we must "borrow" one from the next higher decade. This will reduce the higher decade by one unit, which unit is equal to ten of the former decade. This will reduce the higher decade by one, and it must be so considered when subtracting from it in the next operation.

It will be observed that the above point is automatically taken care of, since after the arm passes 9 on the outer scale, it causes the reading to be one short in the preceding dial. The contact arm may go around as far as 9 in the first measurement, and since the first setting is taken as a new zero in making the second reading, the contact arm could pass on to 18.

A further application would be to give the dial rheostat 31 contacts, instead of 21 as shown in Fig. 19, and use it thus:—Assuming a case where the nearer end of the conductor to be tested is some distance from the testing apparatus, a connecting or "leading in" wire will be required to join the testing apparatus and the conductor to be tested. Suppose a reading is to be made through such a leading-in wire, on account of the near end of the conductor under test being some distance from the instrument. The leading in wire to be connected to the faulty wire can be grounded, after looping same with the other leading-in wire, and the feet equivalent (or other unit equivalent), or the ohms to the point of "fault," determined. The movable dial would be numbered to the left from 0 as far as 10 as shown in Fig. 19. A hole, as 0ª 1ª 2ª, is placed radially with each figure and is adapted to receive a plug to enable the value of the leading-in wire to be registered. The next operation is the same as previously described, as the first operation, with battery grounded. Each movable dial is then turned to the right until the plug marker is opposite the contact arm pointer. Each contact arm pointer is then turned forward to opposite 0 on the movable dial (if the plug marker is not at 0), and a reading is taken for the second operation for the determination of $q$. The reading as indicated on the movable dial is the value to the fault on the faulty wire, less the value of the leading-in wire. It will be noted in this connection that the actual value obtained in the final balance will always be as large or larger than the value previously indicated. Say a ratio of 1 in the $a$ arm to 9 in the $b$ arm is used; then the value in the rheostat after taking the first reading per Fig. 25 or 26, will be nine times the value from the fault around through the good wire to the instrument, less the value from the instrument to the fault, on the faulty wire. When the final balance is taken, the rheostat has a value of 9 times the total resistance between the terminals of the instrument, which must obviously be greater, with a possible exception, when it may be the same. The final reading will always be positive, that is, the pointers will have to be set ahead, if changed at all from the previous setting. This case is the same as the arithmetic case in which a first number is to be subtracted from a second, and a third number to be again subtracted from the difference. The same result could be obtained by adding the third number to the first number, and then subtracting this sum from the second one. In the latter instrument, a dial of which is shown in Fig. 19, the value of the first balance corresponds to the first number; the actual resistance as inserted (total) by the rheostat in the final balance being around the loop, with battery connected to the terminal to which is also connected the near end of the faulty wire, corresponds to the second number; and the value as found for the leading-in wire, is the third. The equivalent of the adding of the first to the third is made when the contact arm pointer is moved ahead from the marking plug which is on the movable dial to 0 on the movable dial. In the above it is understood that the value as indicated for the leading-in wire, is not the "net" value, which could be determined by dividing according to the ratios used, but is the value as shown on the instrument. It is further understood that the same ratio must be used in the entire process of a single fault location without change.

The inner dial, as shown in Fig. 19, has two sets of numbers placed concentric with each other. Four or more such dials would be used in an instrument made along the lines of those shown in Figs. 3 and 4. The outer set of numbers on the movable dial number from 0 to 10 inclusive, spaced radially with the rheostat contact studs. The inner set numbers from 0 to 10 inclusive, 0 is placed radial with the outer 0, but each succeeding number is placed radial to the alternate numbers on the outer scale, so that "5" of the inner scale will be opposite 10 of the outer scale. The units rheostat may have markings between, there being a number radial with each contact stud, up to 20, each alternate number being a whole number and a decimal fraction. The object of the second scale of figures on each movable dial is to facilitate measuring by the Varley method, when equal values are used in the ratio arms. Ordinarily the well-known formula is applied, which is:

$$\frac{L-r}{2} \text{ or } \frac{1}{2}(L-r)$$

equals, the resistance to the fault. This method is often convenient to use when measuring very long lines. It will be noted that the instrument of Fig. 3 or Fig. 4 could be used by selecting equal values in the $a$ and $b$ arms, proceeding as before, and finally dividing the value as read from the instrument by two, which would give the value in ohms. However in marking the dials as described and as shown in Fig. 19, the value can be read directly from the instrument. In adjusting the dials when making the final balance, beginning at the left or "thousands" side, the contact arm is moved over two studs at a time instead of one stud at a time as previously, the inner scale on the movable dial being graduated for each alternate stud as previously described. The right, or units, rheostat contact arm can be moved over one stud at a time, thus indicating within one-half a unit, as determined by the decimal fraction.

In making an ordinary resistance reading, or measurement, the reading on the outside dial would be used. It will be observed that in making an ordinary resistance reading with the dial type as shown in Fig. 5, that the leading-in wire value can be easily subtracted by turning the movable dial until its 0 is opposite the value for the leading-in loop as shown on each decade dial; and starting from this point as a new zero, read the value from the movable dial.

In Fig. 20 is shown a circuit arrangement adapted to the dial of Fig. 19.

In Fig. 21 a plug form of rheostat is shown. The wiring scheme is fundamentally as shown for the rotary rheostats, the plugs corresponding to the contact arms. A minor, and not really necessary addition is made in that the right hand block in each decade is shown connected to the adjacent bar. This provision is made so that if any or all plugs are withdrawn, all the resistance in the arm or arms will be inserted, and the circuit will remain closed. In the dial form, the contact arm does not allow the circuit to become open.

It will be noted in Fig. 21 that a sliding scale is used, placed over the blocks of each decade, though only one is shown over the "hundreds" decade blocks. This sliding scale device consists of a trough 60 and a sliding scale 61. The trough 60 is attached by screws to plug blocks corresponding to scale numbers 0—7—14 and an extra block. The plug blocks enumerated are conductively attached to each other by the wire 62, and the trough 60 is lifted above the surfaces of other plug blocks by the interposition of washers 64. In using this form of rheostat, the sliding scale would be moved to the right until its zero is opposite the plug, as adjusted with battery grounded in the first operation, and the result, after the second balance, would be read from the movable scale. This form can be amplified to obtain the same scope as previously described for the dial form of Fig. 19, by adding blocks and graduating the scale correspondingly. The basic circuit scheme of this bridge is the same as ordinarily used, many forms, having essentially the same circuits, being manufactured. However, an important difference lies in the details of the adjustable arms, and the fact that the $b$ arm must be so arranged that the special values can be set in it.

Mechanical arrangements of bridge arms are shown in Figs. 3 and 4. In Fig. 3, the lower arm may be 1 ohm, 10 ohms, 100 ohms or 1000 ohms by selecting the proper position of the plug 70; the upper arms may be varied in resistance by selecting proper positions for the plugs 71 and 72, the possible resistances being 9 ohms, 90 ohms, 99 ohms, 900 ohms, 990 ohms or 999 ohms for tests by my improved process, or 1 ohm, 10 ohms, 100 ohms, or 1000 ohms for equal or decimal ratio arms for ordinary uses of the bridge.

In the bridge arms illustrated in Fig. 4 the arm formed in part of conductor $a^4$ may be set at 1000 ohms, 100 ohms, 10 ohms, 1 ohm or 10.8 ohms as desired, by selecting the proper position for the plug 73. The arm formed in part of conductor $b^4$ has a possible adjustment by steps of one ohm each from zero to 11,110. Thus a ratio of equality, of 1/9 or of 1/10 may be set in the arms, or by the use of the special resistance of 10.8 ohms in the $a^4$ arm a further simplification of results in some cases may be attained.

A most important feature is that of the bridge-arm ratio, which by previous determination may eliminate all calculation of the resistance in ohms to the fault, which is the result desired. It is not always necessary, however, to know the resistance in ohms to the fault, as it is frequently important to know the distance in feet or meters, if the conductor be in a cable. In fact, the determination of the resistance to the fault is usually used as a basis of determining the distance to the fault. My invention is capable of quite as convenient use to read directly in terms of distance as in terms of resistance, and by the application of the same principles as I have already described.

Generally stated, the principle as applying to resistance determinations is that one bridge arm shall be to the sum of the arms as 1 is to a power of 10.

In the case of results to be reached in terms of distance, the principle may be stated as being that one bridge arm shall be to the sum of the arms as 1 is to the length per ohm of the conductor under test. Thus, in the case of feet, as 1 is to the feet per ohm of the conductor, or in the case of miles, as 1 is to the miles per ohm of the conductor.

To illustrate, suppose a conductor having 63 feet per ohm were under test: In making the Varley loop test as in Fig. 3, the arm $a$ might be given a value of unity and the arm $b$ a value of 62, equal to 63—1. Then the formula $$R = \frac{ra}{a+b},$$

which finally expresses the result, becomes, with these values, $$R = \frac{r}{63},$$

in which R is the resistance in ohms to the fault. If now D be taken as the distance in feet to the fault, it is evident that $D = 63R$, whence it follows that $D = r$. In other words, the adjusted value of the resistance $r$ (or $q$) is equal to the distance in feet to the fault, and the instrument thus used is direct reading.

Were the conductor under test of resistance of 63.2 feet per ohm, the bridge might be set at 1 and 62.2 respectively for the arms, or to 10 and 622 ohms, since in either case the ratio is the same.

The quantity, feet per ohm, meters per ohm, etc., depends upon the specific resistance, the area of cross section, and the temperature of the conductor and the conductor material, and can be determined by well-known means, as from tables. In the case of copper, for example, the resistance of a foot of circular wire one-thousandth of an inch in diameter, may be said to be 10.8 ohms. If the cross section of a copper wire expressed in circular mils be divided by 10.8, the result will be the number of feet per ohm of the wire. A foot of wire one-thousandth of an inch in diameter is called a mil-foot; similarly, a mil-yard, mil-mile or mil-meter resistance may be employed, the result of division being in terms of yards per ohm, miles per ohm, meters per ohm, etc. Applying this matter to the simplification of tests to be read in distance, I may adjust the bridge arms,—for example, in Fig. 4,—so that arm $a^4$ is to the sum of the arms $a^4$ and $b^4$ as the mil-foot of resistance of copper is to the area in circular mils of the wire under test. On balancing to a zero movement of the galvanometer by adjustment of the two resistances as described for that figure, such a value of $r$ or $q$ is directly given as corresponds to the distance in feet to the fault. For example, if the tests were being applied to a faulty conductor in a cable formed of wires of #22 Brown & Sharpe gage, the faulty conductor would be looped with any good conductor at the distant end; the area of #22 wire in circular mils being 642.8, and the mil-foot resistance of copper being 10.8, the bridge would be respectively 10.8 for $a^4$ and (642.8—10.8) or 632 ohms for $b^4$.

In Figs. 1, 2, 3, 4, 25 and 26, B' and B'' are binding posts for the attachment of battery B; G is a post for attachment of an earth conductor; X' X'' are posts for the attachment of leading-in wires for the resistance to be measured or for the conductors to be tested for fault location; K is a three-point switch adapted when the lever is in its left-hand position to connect the battery terminal B'' to the earth terminal G, and when in its alternative position as shown to connect the battery terminal B'' to the terminal X'' of the resistance or conductor under test; D is the detector or galvanometer.

Fig. 19 shows the preferred form of my rotary rheostat and scale, although the form of Figs. 5 to 18 is used for Figs. 3 and 4 and is made the subject of detailed description because of its greater simplicity.

Having thus described my invention, what I claim as new and desire to secure by United States Letters Patent is:

1. In an electrical testing device, apparatus parts adapted by proper connection to form a Wheatstone bridge, a decimal rheostat forming a part of said apparatus and having resistance units, ten of which are equal in resistance to one unit of the rheostat of the next decade; a movable scale on said rheostat, and unit resistance steps in said rheostat exceeding by nine the effective calibration of said movable scale, substantially as described.

2. In an electric testing device, a rheostat a movable scale for said rheostat numbered with scales in both directions from a zero point, and having means for retaining markers in association with one of the scales whereby a test may be tentatively recorded, substantially as described.

3. In an electrical testing device, a rheostat having three sets of scale divisions, one set being fixed and the remaining two sets being upon an integral mechanical element and numbering in both directions from a common zero, whereby two tests recorded upon said joined scales will have the sum thereof indicated by the distance between the points of indication of the two tests, substantially as described.

4. In an electrical testing device, a rheostat, a set of three scales for said rheostat, two of the scales being movable with respect to the third scale, whereby two readings may be mechanically added and recorded by the two movable scales and the sum thereof mechanically subtracted from a third reading which is directly readable upon the third or fixed scale, substantially as described.

5. In an electrical testing device, a current indicator; switches and ratio resistances forming parts of a Wheatstone bridge; a compound rheostat forming the balancing arm of said bridge; and a plurality of indicating scales associated with units of resistance in said compound rheostat, whereby said bridge may be balanced, first against one set of physical conditions and then, using this set as a basis, against another set of physical conditions.

6. In an electrical testing device, a current indicator; switches and ratio resistances forming parts of a Wheatstone bridge; a compound rheostat forming the balancing arm of said bridge; a fixed scale and a coöperating switch arm therefor, adapted to record a balance of said bridge against one set of physical conditions; and a movable scale, said switch arm coöperating therewith adapted to record a balance of said bridge against another set of physical conditions upon the basis indicated by the first scale.

7. In an electrical testing device, a current indicator; switches and ratio resistances forming parts of a Wheatstone bridge; a compound rheostat forming the balancing arm of said bridge; a fixed scale and a coöperating switch arm therefor adapted to record a balance of said bridge against one set of physical conditions; and a movable scale, said switch arm coöperating therewith adapted to record a balance of said bridge against another set of physical conditions upon the basis indicated by the first scale, whereby the two balances so recorded upon said joined scales will have the sum thereof indicated by the distance between the points of indication of the two balances.

8. In an electrical testing device, a current indicator; switches and ratio resistances forming parts of a Wheatstone bridge; a compound rheostat forming the balancing arm of said bridge; a fixed scale and a coöperating switch arm therefor adapted to record a balance of said bridge against one set of physical conditions; and a pair of scales relatively mutually movable, said switch arm coöperating therewith, each of said scales adapted to record a balance of said bridge against another set of physical conditions upon the basis indicated by a previously-used one of said scales, whereby two records may be mechanically added and recorded by the said movable scales and the sum thereof mechanically subtracted from a record which is directly readable on the said fixed scale.

Signed by me at Portland, county of Multnomah, and State of Oregon, in the presence of two witnesses, this 27th day of May 1907.

HERBERT M. FRIENDLY.

Witnesses:
    HENRY MATTHEW,
    M. S. FRIENDLY.